(12) United States Patent
Wrigglesworth, III et al.

(10) Patent No.: US 7,415,148 B2
(45) Date of Patent: Aug. 19, 2008

(54) SYSTEM AND METHOD FOR DETECTING ANOMALOUS TARGETS INCLUDING CANCEROUS CELLS

(75) Inventors: Walter Wrigglesworth, III, Tucson, AZ (US); Jayne M. Hall, Sahuarita, AZ (US)

(73) Assignee: Raytheon Company, Waltham, MA (US)

( * ) Notice: Subject to any disclaimer, the term of this patent is extended or adjusted under 35 U.S.C. 154(b) by 867 days.

(21) Appl. No.: 10/633,815

(22) Filed: Aug. 4, 2003

(65) Prior Publication Data

US 2005/0031183 A1 Feb. 10, 2005

(51) Int. Cl.
*G06K 9/36* (2006.01)
(52) U.S. Cl. ...................... 382/133; 382/128
(58) Field of Classification Search .................. 382/133
See application file for complete search history.

(56) References Cited

U.S. PATENT DOCUMENTS

| | | | |
|---|---|---|---|
| 3,675,768 A * | 7/1972 | Legorreta-Sanchez | 209/4 |
| 6,005,256 A | 12/1999 | McGlynn et al. | |
| 6,104,429 A | 8/2000 | Thurman | |
| 6,125,339 A * | 9/2000 | Reiser et al. | 702/181 |
| 6,393,137 B1 | 5/2002 | Chen et al. | |
| 2001/0033675 A1 * | 10/2001 | Maurer et al. | 382/103 |
| 2001/0051004 A1 * | 12/2001 | Wang | 382/206 |
| 2002/0001402 A1 * | 1/2002 | Berliner | 382/133 |
| 2003/0041053 A1 * | 2/2003 | Roth | 707/3 |
| 2003/0072470 A1 * | 4/2003 | Lee | 382/103 |

FOREIGN PATENT DOCUMENTS

WO WO 9743732 A1 * 11/1997

* cited by examiner

*Primary Examiner*—Bhavesh M Mehta
*Assistant Examiner*—John W Lee
(74) *Attorney, Agent, or Firm*—Schwegman, Lundberg & Woessner, P.A.; Gregory J. Gorrie

(57) ABSTRACT

A method and system for identifying anomalous cells includes an imaging subsystem to generate a track file from collected images of cells, a image processing subsystem to extract features from the track file and generate feature sets for particular cells, and a discrimination subsystem to generate a probabilistic belief function from the feature sets to determine a probability that at least some of the cells are anomalous. The images may include sample cells from a tissue sample. In embodiments, the imaging subsystem may collect images from photographs and may also collect images from a microscope. In embodiments, the discrimination subsystem may perform both supervised and unsupervised training to update the belief functions learning from known anomalous cells and cells with know anomalous features to enhance its accuracy over time.

23 Claims, 7 Drawing Sheets

SYSTEM AND METHOD FOR DETECTING ANOMALOUS TARGETS INCLUDING CANCEROUS CELLS

TECHNICAL FIELD

The present invention pertains to target anomaly detection, and in some embodiments, to detection and identification of anomalous cells, such as cancer cells, and in some other embodiments, to screening targets for anomalies.

BACKGROUND

Conventional anomalous cell screening techniques rely on human operators (e.g., a laboratory technician) to identify anomalous cells by screening tissue samples through a microscope. One limitation to conventional screening techniques is that the accuracy varies greatly depending on the experience as well as the visual acuity of the laboratory technician. For example, these conventional techniques can result in high false-negatives in detecting cervical cancer cells, failing to identify many instances of cervical cancer.

Another limitation to conventional screening techniques is that they generally look for known defects instead of identifying cells with normal characteristics to identify other anomalies, whether known or unknown. Another limitation to conventional screening techniques is that they are sometimes limited to detection of anomalies based on a particular set of rules for anomaly detection per screen. Another limitation to conventional screening techniques is that tissue samples are usually sent to an off-site laboratory for the screening, which may add several days, and even weeks, before the results are available. Another limitation to conventional screening techniques is that a laboratory generally performs screening for one or two particular anomalies (e.g., a particular type of cancer) and may be unable to perform screening for other anomalies. Reasons for these limitations are many, and include the skill of the laboratory technicians and the available resources at the site. As a result of these limitations, certain anomalies may go undetected or additional samples and screening may be required.

Another limitation to conventional screening techniques is that use of prior experience in detecting anomalies may not be effectively utilized. In other words, it is sometimes difficult for current screening techniques to improve their accuracy based on prior correct and/or erroneous results, and thus it is difficult for continuous improvement and validation of those screening abilities. Finally, conventional methods of screening generally make use of only one source of images at a time, such as a visible image of a cancer cell as seen through a microscope.

Thus there are general needs for improved systems and methods to detect anomalous targets, particularly for detecting anomalous cells such as cancerous cells. There are also needs for more accurate systems and methods to detect anomalous cells. There are also needs for systems and methods for detecting anomalous cells that provide results quicker, as well as systems and methods that learn from their results to further improve their accuracy. There are also needs for systems and methods for detecting anomalous targets using one or more sources of images simultaneously.

SUMMARY

In some embodiments, a method and system for identifying anomalous targets includes an imaging subsystem, an image processing subsystem, and a discrimination subsystem. The imaging subsystem may generate a track file from collected images of targets, the image processing subsystem may extract features from the track file and generate feature sets for particular targets, and the discrimination subsystem may generate a probabilistic belief function from the feature sets to determine a probability that at least some of the targets are anomalous, with the ability if so desired, to update the discrimination subsystem and probabilistic belief function based on confirmed output. The input (e.g., images) may include sample cells from a tissue sample for detection of cancerous cells, although the scope of the invention is not limited in this respect. In embodiments, the imaging subsystem may collect images from photographs and may also collect images from a microscope, or from a device measuring energy output, although the scope of the invention is not limited in this respect. In embodiments, the discrimination subsystem may perform both supervised and unsupervised training to update the belief functions learning from known anomalous targets, including known cancerous cells, to enhance the accuracy of the belief functions over time.

BRIEF DESCRIPTION OF THE DRAWINGS

The appended claims are directed to some of the various embodiments of the present invention. However, the detailed description presents a more complete understanding of embodiments of the present invention when considered in connection with the figures, wherein like reference numbers refer to similar items throughout the figures and:

DETAILED DESCRIPTION

The following description and the drawings illustrate specific embodiments of the invention sufficiently to enable those skilled in the art to practice them. Other embodiments may incorporate structural, logical, electrical, process, and other changes. Examples merely typify possible variations. Individual components and functions are optional unless explicitly required, and the sequence of operations may vary. Portions and features of some embodiments may be included in or substituted for those of others. The scope of embodiments of the invention encompasses the full ambit of the claims and all available equivalents of those claims.

Although many embodiments of the present invention pertain to detecting anomalous cells, such as cancerous cells, the scope of the invention is not limited in this respect. Embodiments of the present invention also pertain to detecting and/or screening almost any type of target including, for example, the screening of solder joints for anomalies, the screening of resistors, pill identification, asbestos contamination screening, the screening of MRI images, or other input data pertaining to energy emissions of specified targets. In some embodiments, the anomalous target identification system of the present invention may evaluate, characterize, confirm and update the detection ability on one or more input files (e.g., images) with multiple sets of characterization identifiers such as physical properties, chemical properties, movement through time, or emitted energy output. In some embodiments, anomalous energy emissions or structural defects, among other things, may be identified.

Figure 1:
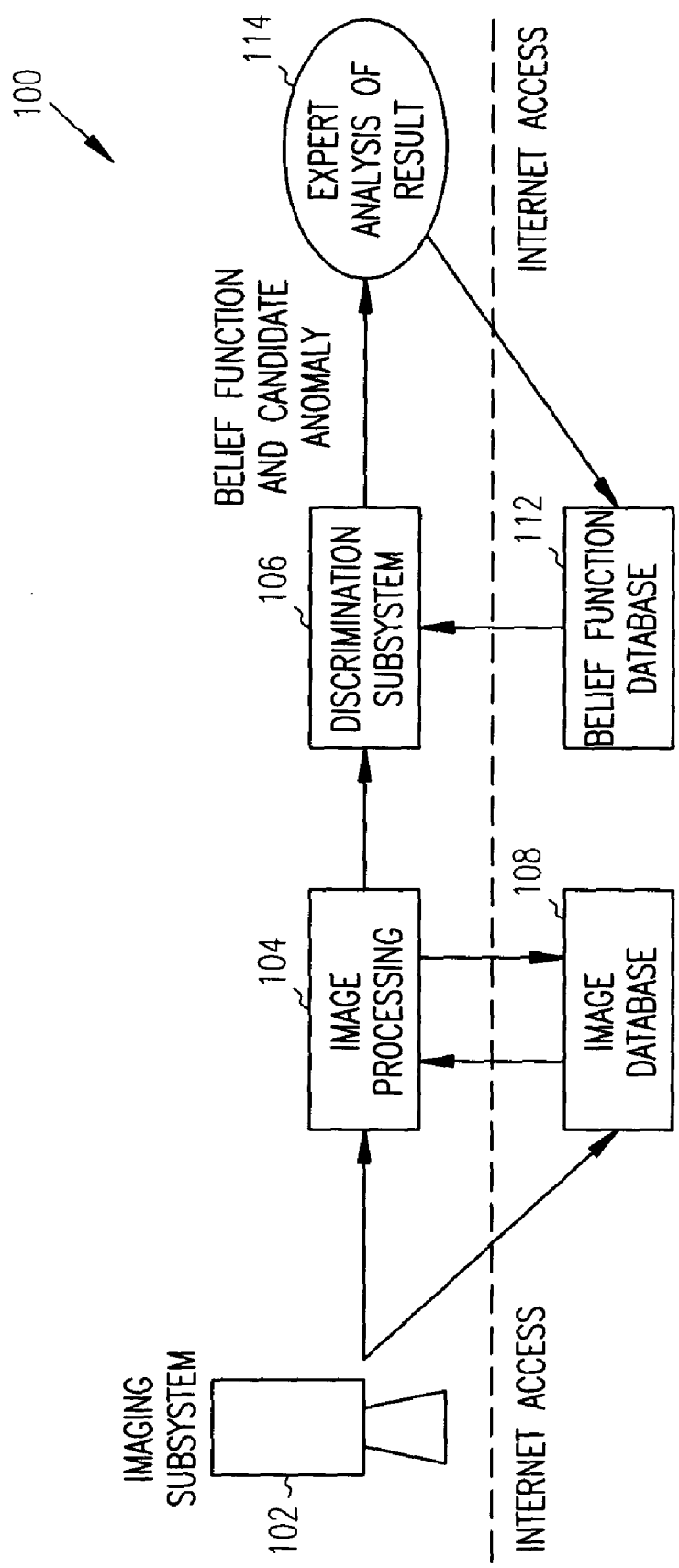
FIG. 1 is a functional block diagram of an anomalous target identification system in accordance with embodiments of the present invention.

FIG. 1 is a simplified functional block diagram of an anomalous target identification system in accordance with embodiments of the present invention. Anomalous target identification system 100 includes imaging subsystem 102 to generate a track file from collected inputs (e.g., images) of targets, image processing subsystem 104 to extract features from the track file and generate feature sets for particular targets, and discrimination subsystem 106 to generate a probabilistic belief function from the extracted feature sets to determine a probability that at least some of the targets are anomalous.

In some embodiments of the present invention, targets comprise cells, and may particularly comprise cells from tissue samples. In these embodiments, system 100 may be used to identify images that contain anomalous cells, such as cancerous cells, based on certain features. Cells that may be suitable include, for example, cervical cells taken from a PAP-smear, cells taken from esophageal tissue samples, cells taken from lung tissue samples, or cells taken from breast tissue samples.

Imaging subsystem 102 may generate track files of images that may include sample cells from a tissue sample. In some embodiments, imaging subsystem 102 may generate track files from photographs. In other embodiments, imaging subsystem may generate track files from images collected from a microscope, camera, video camera, video signal, charge-coupled-devices (CCDs), energy emission detectors, or other sources of input data convertible to a track file for identification/characterization purposes. Images may also be retrieved from one or more image databases 108. In some embodiments, image databases 108 may be accessed from remotely located sites over the Internet or some other network.

In some embodiments, imaging subsystem 102 generates the track files from optical data to comprise an array of elements (e.g., pixels) to represent the image. Each array element may include at least two-dimensional (2D) imaging components (e.g., grey scale or color), and each array element may further include a velocity component and/or a rotational component to represent respectively velocity and/or rotation (if any) of targets exhibiting velocity and/or rotation within the image. In some embodiments, the track file may further provide centroid tracking of particular targets. In some embodiments, the velocity component represents movement of a target within a field-of-view of the image, and the rotational component represents rotational movement of a target within the field-of-view of the image.

In some embodiments, imaging subsystem 102 generates the track file from optical data to comprise an array of elements to represent the image, where each array element may include three-dimensional (3D) imaging components. The 3D imaging components may be generated from images at a plurality of two-dimensional focal planes. In some embodiments, imaging subsystem 102 generates a plurality of 2D images of the sample targets at various depths to generate the 3D imaging components of the track file for the image. For example, a microscope or camera may be focused at different depths/heights and an image at each height (e.g., at a focal plane) may be used to generate the track files. In some embodiments, imaging subsystem 102 may generate track files from two or three dimensional LIDAR imaging, RADAR imaging, infrared (IR) imaging, a spectrophotometer, or electromagnetic emissions. In some embodiments, imaging subsystem 102 generates the track file from images retrieved from a remotely-located database, such as database 108, over a network such as the Internet.

Examples of imaging subsystems and methods that may be suitable for use as at least part of imaging subsystem 102 are described in U.S. Pat. No. 6,104,429 entitled "Integration of TV Video with IR Tracker Features", which is assigned to assignee of the present application and incorporated herein by reference, although the scope of the invention is not limited in this respect. Other imaging techniques may also be suitable for use by imaging subsystem 102.

Image processing subsystem 104 extracts features from targets using the track file and generates feature sets for the targets. The feature sets may indicate features such as motion and/or rotation (kinematic features), target size, target shape, target color in multiple wavelengths of illumination (e.g., color in visible spectra, grayscale in IR spectra), target outline, ratio of target size to other targets, ratio of size of predetermined elements (e.g., nucleus size to cytoplasm ratio), orientation of target features with respect to background (e.g., capacitor polarity markings with respect to circuit card), rate of absorption of dye, rate of mutation, electromagnetic emission output, and structural features such as defects (e.g., cracks, or a non-uniform cross section), although the scope of the invention is not limited in these respects. Accordingly, image classifying system 104 may identify targets within the image having predetermined features.

In some embodiments, image processing subsystem 104 further identifies the targets within the image using the track files, and generates the feature sets for the identified targets. In some embodiments, the features sets may be stored in a database, such as a feature set database, which may be remotely located and accessed over a network, such as the Internet.

In some embodiments, image processing subsystem 104 further generates a descriptor associated with each feature set of each identified target to indicate when the target at least meets a criteria for the associated feature set. For example, when a target cell is too large, has an odd shape, a large nucleus, or is moving or rotating faster than the other cells, a descriptor may be generated for that feature set. Some examples of descriptors include the ratio of the nucleus diameter to the outer cell diameter (e.g., for a cervical tissue cell), the ratio of the length of a cell to its diameter (e.g. to detect oat-cell carcinoma), the color or darkness of a cell (e.g., to detect melanoma in a lymph-node tissue sample).

In some embodiments, image processing subsystem 104 may include a morphological filter to perform morphological filtering on identified targets. The morphological filter may be embodied in software, although the scope of the invention is not limited in this respect. The filtering may exaggerate features for identified targets meeting a criteria for a feature set. Predetermined features that were extracted by image processing subsystem 104 may be exaggerated. In some embodiments, when image processing subsystem 104 identifies target cells having normal-sized nuclei, the morphological filter may attenuate the normal-sized nuclei and may darken nuclei of target cells having larger than normal-sized nuclei. Image processing subsystem 104 may also generate a morphed image file with the exaggerated/morphed features for displaying a morphed image to an operator to help the operator identify anomalous targets. In other embodiments, other types of mathematical processing may be performed to assist with discrimination. Image processing subsystem 104 may employ other mathematical filtering techniques on features of targets and is not limited to performing morphological filtering.

Examples of image classification systems and methods that may be suitable for at least part of image processing subsystem 104 are described in U.S. Pat. No. 6,393,137 entitled "Multi-Resolution Object Classification Method Employing Kinematic Features and System Therefor", which is assigned to assignee of the present application and incorporated herein by reference although the scope of the invention is not limited in this respect. Other image classification and feature extraction systems and techniques may also be suitable for use by image classification subsystem 104.

Discrimination subsystem 106 generates belief functions for at least one feature of the identified targets. Belief functions may be stored in belief-function database 112. In some embodiments, the belief functions may be generated from at least one selected feature set of the identified targets within the image. In other words, a belief function may be generated for each feature, or a combination of features. In some embodiments, the belief functions are initially generated from images having known anomalous targets as part of a supervised training process (discussed below). In some embodiments, discrimination subsystem 106 updates the initial belief functions as part of an unsupervised training process (discussed below) based on measurable characteristics of the targets identified by image processing subsystem 104. In some embodiments, the initial belief functions and associated feature sets are stored in a remotely-located belief-function database, such as belief-function database 112, for shared use by other systems.

A belief function, as used herein, refers to a discrete probability function that may represent a probability distribution as to the certainty of an outcome. For example, in the case of cancerous cells, shape, nucleus size, motion or rotation, and/or chemical reactions may indicate anomalies in the cells. For example, it may be known that when a cell of cervical tissue has a ratio of nucleus diameter to cell diameter greater than 0.6, the probability that the cell is cancerous is 90%. In some embodiments, belief functions may use multiple images. For example, a first image may be used to generate a belief function based on the ratio of nucleus diameter to cell diameter. A second image may be used to generate a belief function based on the reaction of the cells to stain or dye. The probability of a cell being cancerous due to the nucleus to cell diameter ratio exceeding 0.6 may be 90%, but when the same cell reacts to stain or dye, there may be a much higher (e.g., an almost 99%) probability that the cell with the high nucleus to cell diameter ratio is cancerous. In some embodiments, the probability that a cell is cancerous may be an arithmetic function of the two probabilities leading to a probability that the cell is cancerous. This probability may be different than the 90% probability for the image without stain or dye.

In some embodiments, discrimination subsystem 106 provides revised feature sets to instruct the image processing subsystem to repeat extracting features for the revised feature sets based on belief functions results. For example, a belief function generated from targets having a feature such as an 80% ratio of nucleus size to cytoplasm size may be changed so that features are extracted to identify targets having a relatively larger nucleus (e.g., an 85% nucleus-to-cytoplasm ratio).

In embodiments, discrimination subsystem 106 may perform both supervised and unsupervised training to update the belief functions learning from images with known anomalous cells and cells with measurable characteristics to enhance its accuracy over time. Examples of discrimination systems and methods that may be suitable for use as at least part of discrimination subsystem 106 are described in U.S. Pat. No. 6,125,339, entitled "Automatic Learning of Belief Functions", which is assigned to assignee of the present application and incorporated herein by reference, although the scope of the invention is not limited in this respect. Other discrimination techniques may also be suitable for use by discrimination subsystem 106. In some embodiments, discrimination subsystem 106 may provide the belief function and candidate anomaly for expert analysis 114 of the result. Expert analysis 114 may be performed by a trained operator and may update belief-function database 112.

In some other embodiments of the present invention, targets are not limited to particular cells but may include almost any item or element that can be isolated from other items or elements based on one or more predetermined features. Examples of targets may include fine-needle aspiration (FNA) cells from organs and tumors deep inside the body, solder joints for screening for defects such as cracks, pills for identification and screening, resistors for identification and screening, asbestos samples for contamination detection, MRI images for tumor detection, tissue samples for toxicity measurements, and/or measurements for electromagnetic emission detection.

Although system 100 is illustrated as having several separate functional elements, one or more of the functional elements may be combined and may be implemented by combinations of software-configured elements, such as processing elements including digital signal processors (DSPs), and/or other hardware elements. For example, a system controller, as well as subsystems 102, 104 and 106 may comprise one or more microprocessors, DSPs, application specific integrated circuits (ASICs), and combinations of various software, hardware and logic circuitry for performing at least the functions described herein. In some embodiments, a system controller may coordinate the activities of subsystems 102, 104 and 106.

Figure 2A:
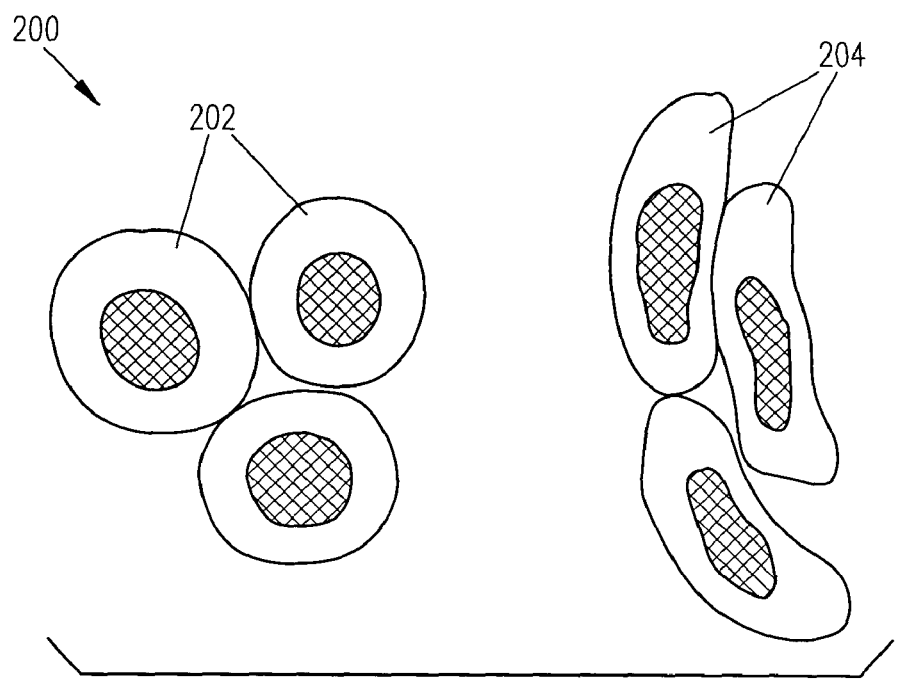
FIGS. 2A, 2B, 2C and 2D illustrate images of cells having identifiable features in accordance with embodiments of the present invention.
Figure 2B:
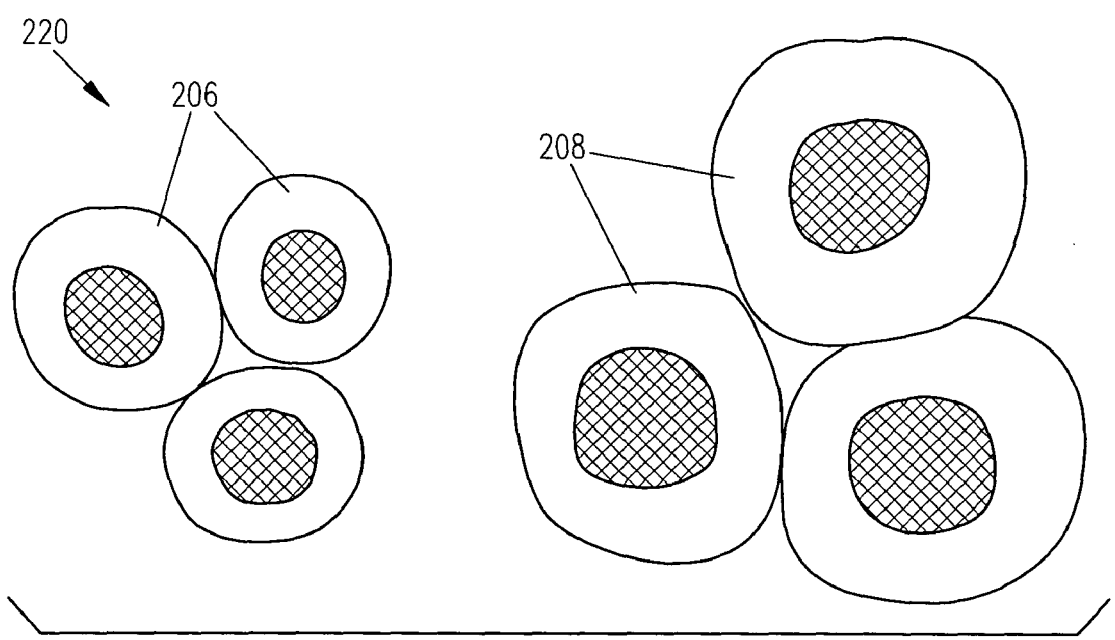
Figure 2C:
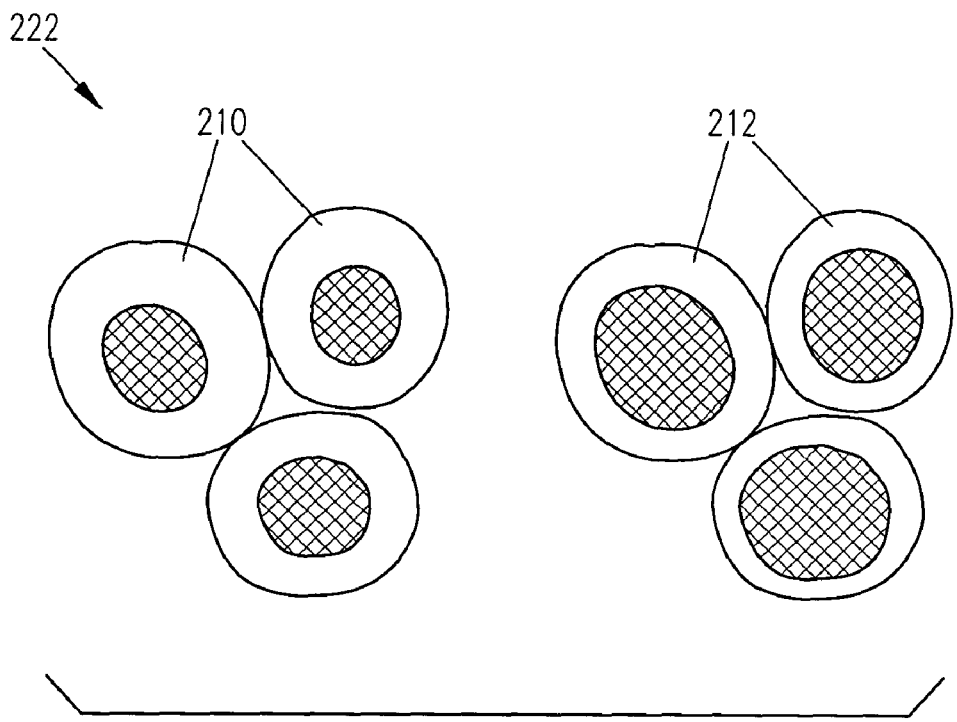
Figure 2D:
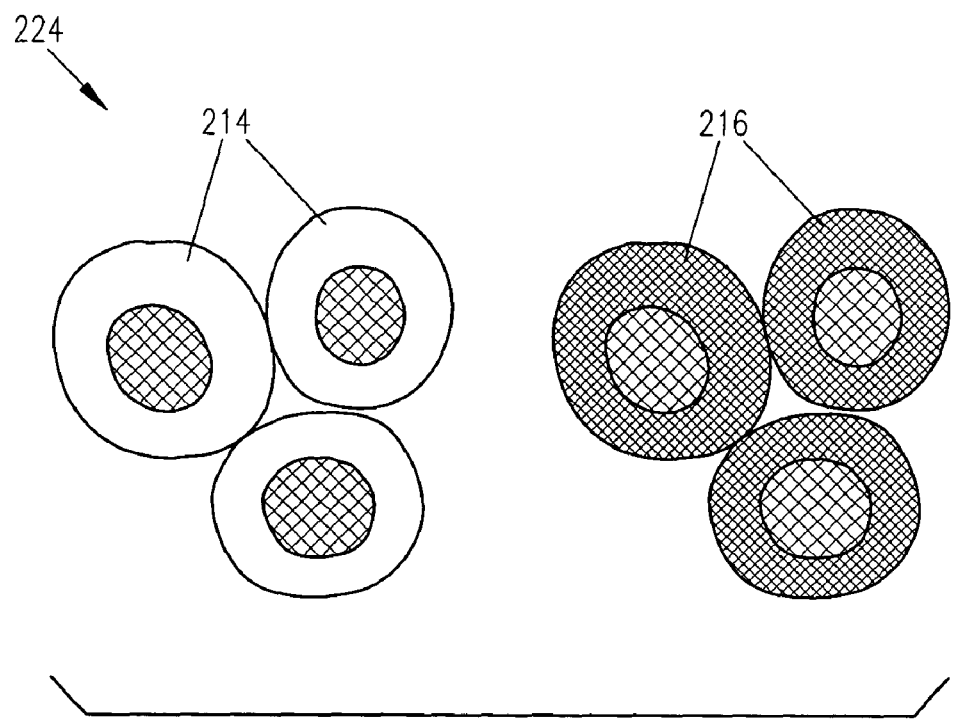

FIGS. 2A, 2B, 2C and 2D illustrate images of cells having identifiable features in accordance with embodiments of the present invention. FIG. 2A illustrates image 200 of cells 202 with normal shapes, and cells 204 having an abnormal shape. FIG. 2B illustrates image 220 of cells 206 of normal size, and cells 208 having an abnormal size. FIG. 2C illustrates image 222 of cells 210 with normal sized nuclei, and cells 212 having enlarged nuclei (i.e., dysplasia). FIG. 2C may also illustrate cells having a nucleus-to-cytoplasm ratio that exceeds certain thresholds. FIG. 2D illustrates image 224 of cells 214 with normal pigmentation and cells 216 having abnormal (e.g., darker) pigmentation.

Other specific features which may be detected and characterized by embodiments of the present invention include types of dysplasia, such as mild, moderate and severe dysplasia. Mild dysplasia is where the nucleus is about 3-4 times larger than normal. Moderate dysplasia is where the nucleus is about 5-6 times larger than normal. Severe dysplasia is where the nucleus is taking up most of the cell. Another feature of "abnormal" cells which may be detected and characterized by embodiments of the present invention includes cells that may exhibit uncontrolled and disorganized growth. Cancer cells in the lungs, for example, may be detected through cytological examination of sputum to identify cancer-associated protein overexpression, using clinically available antibodies plus a series of murine monoclonal antibodies.

The features illustrated in FIGS. 2A, 2B, 2C and 2D, as well as other features described herein, are just some examples of features that may be extracted as feature sets from track files by an image processor or classifier, such as image processing subsystem 104 (FIG. 1). The features illustrated in FIGS. 2A, 2B, 2C and 2D, along with others, may also be examples of features that may be morphologically filtered by a morphological filter, which may be part of image processing subsystem 104 (FIG. 1).

Figure 3A:
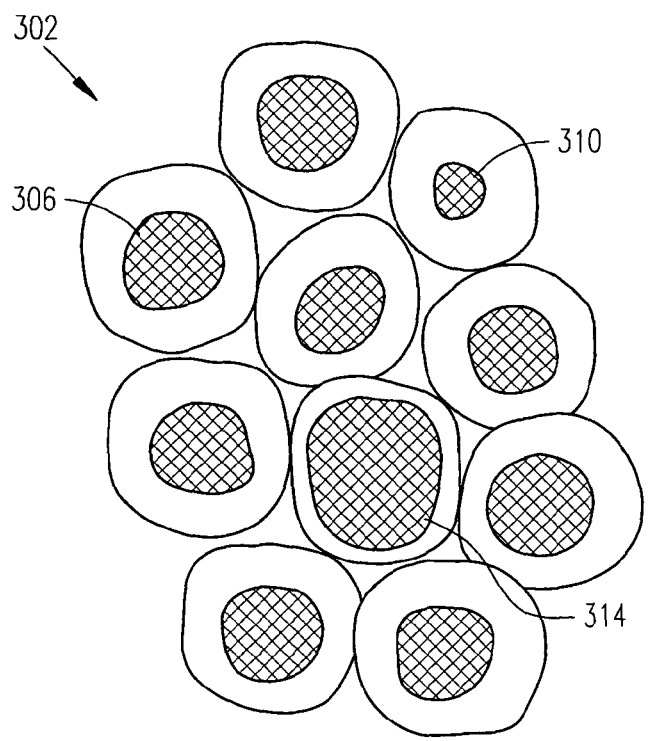
FIGS. 3A and 3B illustrate an example of morphological filtering in accordance with embodiments of the present invention.
Figure 3B:
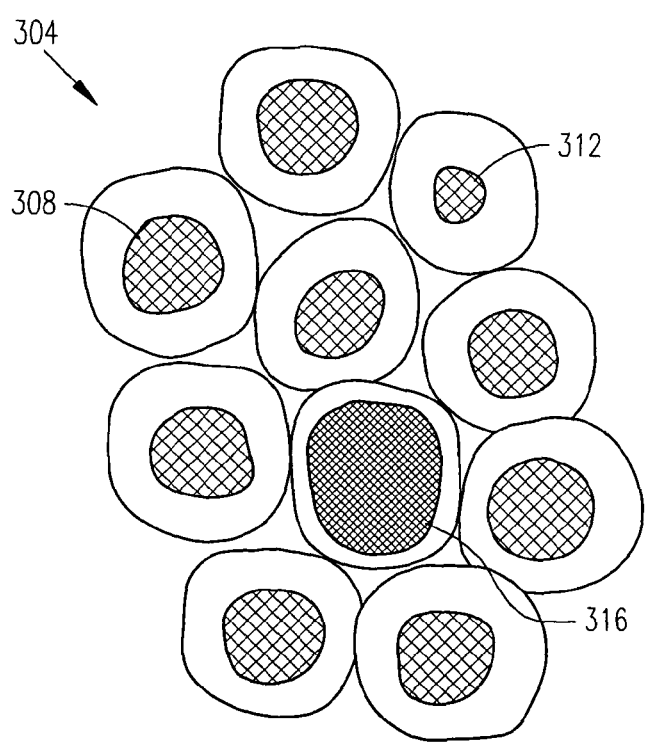

FIGS. 3A and 3B illustrate an example of morphological filtering in accordance with embodiments of the present invention. In embodiments, the morphological filtering illustrated in FIGS. 3A and 3B may be performed by a morphological filter which may be part of image processing subsystem 104 (FIG. 1), although the scope of the present invention is not limited in this respect. Image 302 is a greyscale image of targets, which in this case are cells from a tissue sample. Image 302 may be generated an image generating subsystem, such as image generating subsystem 102 (FIG. 1), although other image generation techniques are also suitable. Image 304 is generated from image 302 after performing filtering, such as morphological filtering. In accordance with this example, morphological filtering attenuates cells with normal sized nuclei, accentuates cells with larger sized nuclei, and has little or no effect on other elements including smaller than normal sized nuclei. In this example, a morphological filter may be applied to situations where the size of nuclei is believed to be an indicator of an anomalous condition. In embodiments, image processing subsystem 104 (FIG. 1) may have access to a feature set from a feature-set database that defines a minimum and maximum diameter or normal for sized nuclei for particular target/cell types.

As illustrated, normal sized nucleus 306 is morphological filtered and corresponds to attenuated normal sized nucleus 308, smaller sized nucleus 310 is morphological filtered and corresponds to a virtually unchanged smaller sized nucleus 312, and larger sized nucleus 314 is morphological filtered and corresponds to darkened larger sized nucleus 316. In embodiments, image 304 may allow a screener, such as a human operator, to more easily identify when an image contains anomalous targets. In addition, image 304 may allow a screener to focus his or her attention on anomalous areas while still allowing inspection of other areas. In one embodiment, thresholds may be set to alert a screener when anomalous targets are present. In some embodiments, identification of anomalous features with the aid of morphological filtering may be used as part of supervised and/or unsupervised training to improve the belief functions utilized by discrimination subsystem 106 (FIG. 1). In some embodiments, image 304 may be used by operators to verify output of system 100 (FIG. 1).

Although FIGS. 3A and 3B illustrate morphological filtering based on nucleus size, embodiments of the present invention include other types of mathematical and/or morphological filtering which may be applied to almost any feature or characteristic of targets. For example, morphological filtering may be applied to target size, target shape, nucleus shape, velocity and/or rotational movement, and/or ratios of target elements.

Figure 4:
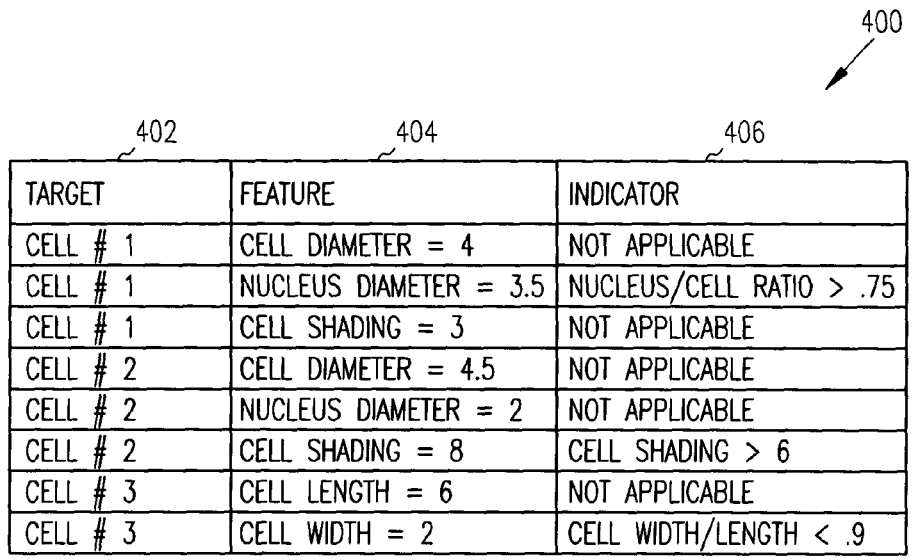
FIG. 4 illustrates a portion of a feature-set table in accordance with embodiments of the present invention.

FIG. 4 illustrates a portion of a feature-set table in accordance with embodiments of the present invention. In embodiments, feature-set table 400 may be generated by image processing subsystem 104 (FIG. 1) for feature sets extracted from track files received from image generator 102 (FIG. 1). In some embodiments, feature-set table 400 may be stored as part of a database that correlates feature sets and targets, among other things. Although the data is illustrated in table form in table 400, the data may also be configured in other forms, including matrix form. In embodiments, each identified target (e.g., a cell) may be listed in column 402, and data (e.g., a feature) for feature sets for that target may be listed in column 404. An indicator, such as flag or descriptor, may be set and provided in column 406 to indicate when the target meets a criteria of the associated feature set.

For example, in row 2 of table 400, the indicator in column 406 indicates that for cell #1, the ratio of the diameter of the nucleus to the cell diameter (as given in the first row) has exceeded a pre-determined value. Also, as indicated in the sixth row, the shading of cell #2 is indicated as having exceeded a pre-determined shade.

Figure 5:
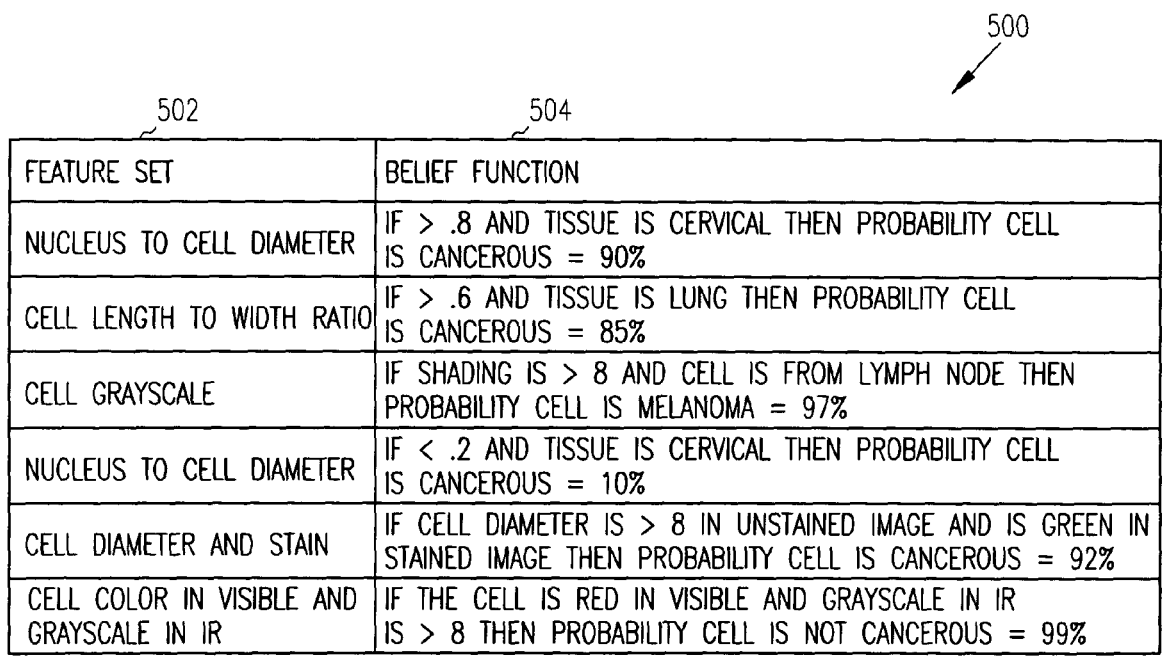
FIG. 5 illustrates a portion of a belief-function table in accordance with embodiments of the present invention.

FIG. 5 illustrates a portion of a belief-function table in accordance with embodiments of the present invention. Belief-function table 500 may be generated by a discrimination subsystem, such as discrimination subsystem 106 (FIG. 1), although other discriminators may also be suitable for generating table 500. Table 500 may list belief functions in column 504 for each of a plurality of feature sets listed in column 502. The feature sets may correspond to the feature sets from feature set database 400 (FIG. 4) although the present invention is not limited in this respect. In some embodiments, belief functions may be generated from multiple images of the same target taken at a different time and/or with different imaging or detection systems. In some embodiments, a first belief function may be generated from one or more targets having a first feature set (e.g., a size feature), and a second belief function may be generated from one or more targets having a second feature set (e.g., a shape feature). In embodiments, belief functions in column 504 may be updated as part of supervised and/or unsupervised training of a discrimination subsystem to help improve the accuracy of the belief functions over time.

In a solder-joint screening embodiment of the present invention, a belief functions may indicate the probability that a solder joint has a crack when a line is present in a visible image and a light line is present at the same location in an x-ray image of the same joint. In a pill-screening embodiment of the present invention, a belief function may indicate the probability that a pill is the correct pill based a combination of the size, geometry, color and/or weight of the pill.

Figure 6:
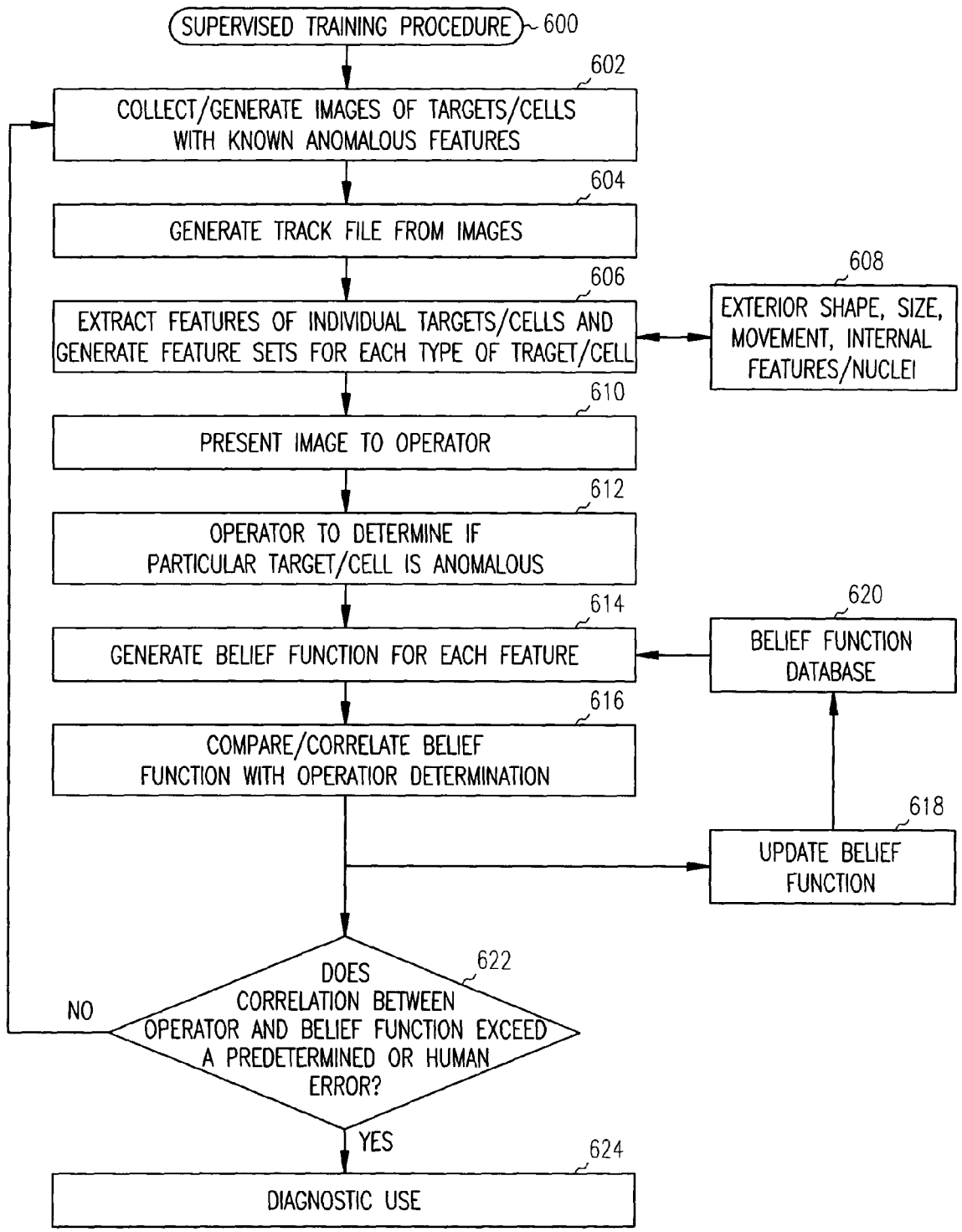
FIG. 6 is a flow chart of a supervised training procedure in accordance with embodiments of the present invention.

FIG. 6 is a flow chart of a supervised training procedure in accordance with embodiments of the present invention. Procedure 600 may be performed by an anomalous target identification system, such as system 100 (FIG. 1) although other systems may also be suitable. In accordance with procedure 600, belief functions are generated and refined based on feature sets having known identifiable features as part of supervised training. Although the individual operations of procedure 600 are illustrated and described as separate operations, one or more of the individual operations may be performed concurrently and nothing may necessarily require that the operations be performed in the order illustrated.

In operation 602, images are collected and/or generated. The images may have known anomalous targets. The images may be collected, for example, from photographs, from a microscope or a video-capture device. The images may be, for example, two-dimensional, three-dimensional, optical, infrared (IR), RADAR or LIDAR images. The anomalous features present in the images may be known. In some embodiments, the images may be generated by image generating subsystem 102 (FIG. 1).

In operation 604, track files are generated from the collected and/or generated images. The track files may comprise a matrix of data representing information in the image and may include a velocity and/or a rotational component to identify portions of the image that are exhibiting velocity and/or rotation when such conditions exist. Operations 602 and 604 may be performed by imaging subsystem 102 (FIG. 1).

Operation 606 extracts feature sets 608 from the track files to identify features associated with targets within an image. The particular feature sets extracted from the track file may be predetermined and may be provided by a discrimination subsystem or by operator input. In some embodiments, the feature sets may be stored in a feature-set database. Operation 606 may also include performing mathematical and/or morphological filtering to exaggerate features for identified targets meeting particular criteria for a feature set. Some examples of feature sets 608 for targets are illustrated in table 400 (FIG. 4). Operation 606 may be performed by image processing subsystem 104 (FIG. 1).

In operation 610, the image from operation 602 may be presented to an operator trained in identifying particular anomalous targets, and in operation 612, the operator may determine whether or not the image contains anomalous targets. In some embodiments, operation 610 may include presenting an image to an operator after performing morphological filtering on the image to help the operator identify anomalous targets.

In operation 614, belief functions may be generated for the feature sets extracted in operation 606. Belief functions may be based on one feature or a combination of features. Some examples of belief functions are illustrated in table 500 (FIG. 5). The belief functions may provide an output indicating a probability that a particular image contains anomalous targets, such as cancerous cells.

In operation 616, the output from the belief function may be compared with a determination made by an operator in operation 612, and in operation 618, the belief function for that feature set may be updated and stored in belief function database 620. Operations 614 through 618 may be performed by discrimination subsystem 106 (FIG. 1).

Operation 622 may determine when there is sufficient correlation between an operator's identification of anomalous targets, and the result of a belief function. In some embodiments, operation 622 may determine when the correlation between an operator's determination and the belief function exceed human error. When there is sufficient correlation, the belief functions stored in belief function database 620 may be ready for diagnostic use in operation 624. When there is not sufficient correlation, the belief functions stored in database 620 may be further refined and/or updated by performing the operations of procedure 600 with additional images having known anomalous features.

Figure 7:
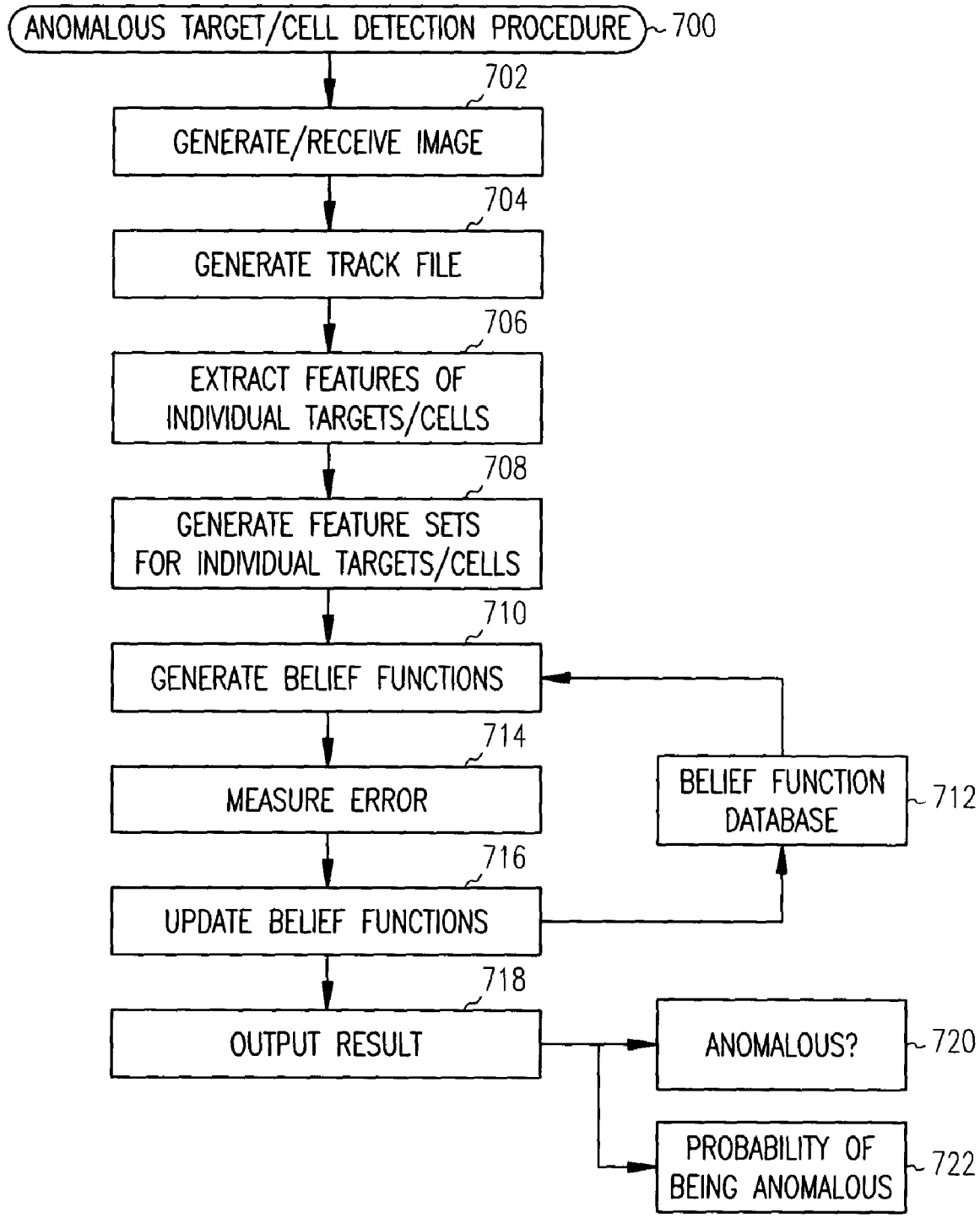
FIG. 7 is a flow chart of an anomalous target detection procedure in accordance with embodiments of the present invention.

FIG. 7 is a flow chart of an anomalous target detection procedure in accordance with embodiments of the present invention. Procedure 700 may be performed by an anomalous target identification system, such as system 100 (FIG. 1) although other systems may also be suitable. In accordance with procedure 700 anomalous targets may be detected from images using established belief functions. In some embodiments, procedure 700 may update existing belief functions as part of an unsupervised training procedure to further enhance accuracy to detect anomalous targets. Although the individual operations of procedure 700 are illustrated and described as separate operations, one or more of the individual operations may be performed concurrently and nothing may necessarily require that the operations be performed in the order illustrated.

In operation 702, an image or image file may be generated and/or received by an imaging subsystem, such as imaging subsystem 102. The image may be moving or stationary and is not necessarily an optical image. In operation 704, one or more track files are generated from the image. In operation 706, features associated with a particular one or more feature sets are extracted from the track files, and in operation 708, feature sets associated with the image are generated. The feature sets may be stored in a feature-set database which may provide a correlation between targets having certain features within the image and the feature sets.

In operation 710, belief functions may be generated for the feature sets and operation 718 may provide an output 722 indicating a probability that the image includes anomalous targets or an output 720 indicating a determination as to whether or not the image contains anomalous targets.

In some embodiments, to help catch false negatives, the image from operation 702 may be presented to a trained operator to help verify the result. In these embodiments, morphological filtering may be applied to the image.

In some embodiments, operations 714 and 716 may be performed as part of unsupervised training which may update belief functions in belief-function database 712. In these embodiments, operation 714 may measure an error by subtracting a combined belief function for particular feature sets from a desired belief function, which may be known (e.g., generated during supervised training). Operation 716 may include updating the belief functions based on the error term.

Thus, an improved system and method for detecting anomalous targets has been described. Also described are systems and methods for detecting anomalous cells such as cancerous cells. A more accurate system and method to detect anomalous cells has also been described. A system and method to detect anomalous cells that provides results quicker, as well as a system and method that learns from results to further improve its accuracy have also been described. An anomalous target identification system that evaluates, characterizes, confirms and updates the detection ability on one or more input files (e.g., images) with multiple sets of characterization identifiers such as physical properties, chemical properties, movement through time, or emitted energy output has also been described.

It is emphasized that the Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims.

In the foregoing detailed description, various features are occasionally grouped together in a single embodiment for the purpose of streamlining the disclosure. This method of disclosure is not to be interpreted as reflecting an intention that the claimed embodiments of the subject matter require more features that are expressly recited in each claim. Rather, as the following claims reflect, inventive subject matter lies in less than all features of a single disclosed embodiment. Thus the following claims are hereby incorporated into the detailed description, with each claim standing on its own as a separate preferred embodiment.

What is claimed is:

1. A system for identifying anomalous targets comprising:
    an imaging subsystem to generate a track file for a plurality of targets, wherein the track file comprises both static and non-static features of the targets imaged over time;
    an image processing subsystem to extract predetermined features from the track files to generate two or more feature sets for the imaged targets, each feature set corresponding to one of the extracted features; and
    a discrimination subsystem to generate two or more probabilistic belief functions corresponding, respectively to the two or more feature sets, and to generate an output by separately weighting the two or more belief functions associated with both the static and the non-static features, the output being a probability indicating whether or not at least some of the targets are anomalous, wherein the belief functions are discrete probability functions comprising probability distributions describing when the targets are likely anomalous, and wherein weights associated with the belief functions are updated based on actual results indicating whether or not the targets are actually anomalous.

2. The system of claim 1 wherein the targets comprise cells of a tissue sample, and wherein the discrimination subsystem initially generates the belief functions from the extracted features and known anomalous cells to provide a probability that at least some of the cells are anomalous, wherein a first feature set comprises a ratio of nucleus size to cell size, wherein a second feature set comprises cell reaction to stain or dye, wherein a third feature set comprises a rotational component of a cell, and wherein a fourth feature set comprises a velocity component of a cell.

3. The system of claim 1 wherein the track files associated with the non-static features include a rate-of-change of one or more of the non-static features.

4. The system of claim 1 wherein the imaging subsystem generates the track files from optical data of tracked targets for melanoma detection, and wherein the static features comprise pigment changes.

5. The system of claim 1 wherein the imaging subsystem generates the track files from optical data to comprise an array of elements to represent the image, each array element to include at least two-dimensional (2D) imaging components, and each array element to further include a velocity component and a rotational component to represent respectively velocity and rotation of targets exhibiting velocity and/or rotation within the image, wherein the velocity component represents movement of a target within a field-of-view of the image, the rotational component represents rotational movement of a target within the field-of-view of the image.

6. The system of claim 1 wherein the imaging subsystem generates the track file for both the static and non-static features from optical data to comprise an array of array elements to represent the image, each army element to include three-dimensional (3D) imaging components generated from images at a plurality of two-dimensional focal planes.

7. The system of claim 1 wherein the imaging subsystem generates a plurality of two-dimensional (2D) images of the targets at various depths to generate three-dimensional (3D) imaging components of the track file for both the static and non-static features.

8. The system of claim 1 wherein the first feature set to indicate at least one static feature comprising target size, target shape, target outline, ratio of target size to other targets, and ratio of size of predetermined elements, and wherein the second feature set comprises a non-static feature comprising at least one of motion and rotation.

9. The system of claim 1 wherein the image processing subsystem includes a morphological filter perform morphological filtering on targets, the filtering to exaggerate features for targets meeting a criteria for a feature set.

10. The system of claim 9 wherein the image processing subsystem identifies target cells having normal-sized nuclei, the morphological filter attenuates the normal-sized nuclei and darkens nuclei of target cells having larger than normal-sized nuclei.

11. The system of claim 9 wherein the image processing subsystem generates a morphed image file with the exaggerated features for displaying a morphed image to the experienced operator to help the operator identify anomalous targets.

12. The system of claim 8 wherein the features sets are stored remotely and are accessed over a network.

13. The system of claim 1 wherein the belief functions are initially weighted based on from known anomalous targets as part of a supervised training process.

14. The system of claim 13 wherein the discrimination subsystem updates the initial belief functions as part of an unsupervised training process based on measurable characteristics of the targets identified by the image processing subsystem.

15. The system of claim 14 wherein the initial belief functions and associated feature sets are stored in a remotely located belief function database for use by other systems.

16. A method for identifying anomalous targets comprising:

generating a track file for a plurality of targets, wherein the track file comprises both static and non-static features of the targets imaged over time;

extracting predetermined features from the track files to generate two or more feature sets for the imaged targets, each feature set corresponding to one of the extracted features; and generating two or more probabilistic belief functions corresponding, respectively to the two or more feature sets, and to generate by separately weighting the two or more belief functions associated with both the static and the non-static features, the output being a probability indicating whether or not at least some of the targets are anomalous, wherein the belief functions are discrete probability functions comprising probability distributions describing when the targets are likely anomalous, and wherein weights associated with the belief functions are updated based on actual results indicating whether or not the targets are actually anomalous.

17. The method of claim 16 wherein the targets comprise cells of a tissue sample, wherein generating comprises generating the belief functions from the extracted features and known anomalous cells to provide a probability that at least some of the cells are anomalous, wherein a first feature set comprises a ratio of nucleus size to cell size, wherein a second feature set comprises cell reaction to stain or dye, wherein a third feature set comprises a rotational component of a cell, and wherein a fourth feature set comprises a velocity component of a cell.

18. The method of claim 16 wherein a first feature set of the two or more feature sets indicates at least one static feature comprising target size, target shape, target outline, ratio of target size to other targets, and ratio of size of predetermined elements, and wherein a second feature set of the two or more feature sets comprises a non-static feature comprising at least one of motion or rotation.

19. The method of claim 18 further comprising performing morphological filtering on the identified targets, the filtering to exaggerate features for identified targets meeting a criteria for a feature set.

20. The method of claim 19 further comprising identifying target cells having normal-sized nuclei, and wherein morphological filtering attenuates the normal-sized nuclei and darkens nuclei of target cells having larger than normal-sized nuclei.

21. The method of claim 18 wherein generating comprises generating the track files from optical data of tracked targets for melanoma detection, wherein the static features comprise pigment changes.

22. A computer-readable medium that stores instructions for execution by one or more processors to perform operations comprising:
    generation of a track file for a plurality of targets, wherein the track file comprises both static and non-static features of the targets imaged over time;
    extraction of predetermined features from the track files to generate two or more feature sets for the imaged targets, each feature set corresponding to one of the extracted features; and
    generation of generate two or more probabilistic belief functions corresponding, respectively to the two or more feature sets, and to generate by separately weighting the two or more belief functions associated with both the static and the non-static features, the output being a probability indicating whether or not at least some of the targets are anomalous,
    wherein the belief functions are discrete probability functions comprising probability distributions describing when the targets are likely anomalous, and
    wherein weights associated with the belief functions are updated based on actual results indicating whether or not the targets are actually anomalous.

23. The computer-readable medium of claim 22 wherein a first feature set of the two or more feature sets indicates at least one static feature comprising target size, target shape, target outline, ratio of target size to other targets, and ratio of size of predetermined elements, and
    wherein a second feature set of the two or more feature sets comprises a non-static feature comprising at least one of motion or rotation.

* * * * *